(12) United States Patent
Olson et al.

(10) Patent No.: US 7,322,117 B2
(45) Date of Patent: Jan. 29, 2008

(54) SYSTEM AND METHOD FOR COMPENSATING FOR MOTOR MAGNETIC DISTURBANCE OF A COMPASS MEASUREMENT

(75) Inventors: Thomas R. Olson, Holland, MI (US); Todd R. Witkowski, Zeeland, MI (US); Thomas S. Wright, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 58 days.

(21) Appl. No.: 10/546,747

(22) PCT Filed: Feb. 24, 2004

(86) PCT No.: PCT/US2004/005460

§ 371 (c)(1),
(2), (4) Date: May 23, 2006

(87) PCT Pub. No.: WO2004/076973

PCT Pub. Date: Sep. 10, 2004

(65) Prior Publication Data

US 2007/0028471 A1    Feb. 8, 2007

Related U.S. Application Data

(60) Provisional application No. 60/449,600, filed on Feb. 24, 2003.

(51) Int. Cl.
*G01C 17/38*    (2006.01)
(52) U.S. Cl. ....................................... 33/356
(58) Field of Classification Search .................. 33/356, 33/357
See application file for complete search history.

(56) References Cited

U.S. PATENT DOCUMENTS

| | | | |
|---|---|---|---|
| 3,991,361 A * | 11/1976 | Mattern et al. | 33/356 |
| 4,953,305 A | 9/1990 | Van Lente et al. | |
| 5,511,319 A | 4/1996 | Geerings et al. | |
| 5,664,335 A | 9/1997 | Suman et al. | |
| 5,761,094 A | 6/1998 | Olson et al. | |
| 5,878,370 A * | 3/1999 | Olson | 33/319 |
| 6,192,315 B1 | 2/2001 | Geschke et al. | |
| 6,286,221 B1 | 9/2001 | Voto et al. | |
| 6,286,222 B1 | 9/2001 | Voto et al. | |
| 6,401,047 B1 | 6/2002 | Voto et al. | |
| 6,651,003 B2 * | 11/2003 | Woloszyk et al. | 33/356 |
| 6,992,481 B2 * | 1/2006 | Stotz | 324/232 |
| 2003/0023380 A1 | 1/2003 | Woloszyk et al. | |

FOREIGN PATENT DOCUMENTS

EP    0237806 B1    9/1987
JP    10170664 A    6/1998

* cited by examiner

*Primary Examiner*—Christopher W Fulton
(74) *Attorney, Agent, or Firm*—Foley & Lardner LLP

(57) ABSTRACT

A method for correcting a vehicle compass measurement for an interfering magnetic field generated by a vehicle accessory, where the interfering magnetic field has an intensity sufficient to cause a compass measurement error, includes monitoring the operation of the vehicle accessory and detecting a characteristic of operation of the vehicle accessory. A measurement or timing signal is then generated based on the characteristic of operation. A magnetic field for direction is measured in response to the measurement signal and an offset or correction value is determined based at least one the measured magnetic field and the characteristic of operation of the vehicle accessory.

17 Claims, 4 Drawing Sheets

SYSTEM AND METHOD FOR COMPENSATING FOR MOTOR MAGNETIC DISTURBANCE OF A COMPASS MEASUREMENT

CROSS-REFERENCE TO RELATED APPLICATIONS

This application claims the benefit of U.S. Provisional Application No. 60/449,600, filed Feb. 24, 2003.

FIELD OF THE INVENTION

The present invention relates to magnetic direction sensing systems and particularly those for use in vehicles.

BACKGROUND OF THE INVENTION

The instrument panel (or cluster) of a vehicle is generally considered an unsuitable environment for an electronic compass. An electronic compass integrated into an instrument panel of a vehicle will detect a variety of magnetic disturbances that can affect the compass reading. Interfering magnetic fields are caused by various vehicle subsystems, such as, a motor for the vehicle HVAC system, an audio system, etc., and typically vary in magnitude. One significant source of interfering magnetic fields are stepper motors that are used to drive needles of gauges in the instrument panel for various vehicle functions such as speed, rpm, oil pressure, fuel level, and so on. Stepper motors for the instrument display gauges may be in close proximity to the magnetic sensors of the electrical compass integrated into an instrument panel of a vehicle. Therefore, there is a need for a system and method to compensate for the magnetic disturbance caused by motors such as stepper motors.

Prior solutions characterize a magnetic disturbance produced by a vehicle accessory, such as a stepper motor, as a constant magnetic offset that changes little as the vehicle is used. Accordingly, an offset for each vehicle accessory is measured or calculated and stored in memory. The constant magnetic offset may then be accessed when a particular subsystem is in operation.

SUMMARY OF THE INVENTION

In one embodiment, a method for correcting a vehicle compass measurement for an interfering magnetic field generated by a vehicle accessory that has an intensity sufficient to cause a compass measurement error includes monitoring the operation of the vehicle accessory, detecting a characteristic of operation of the vehicle accessory, generating a measurement signal based on the characteristic of operation, measuring a magnetic field for direction in response to the measurement signal, and determining a correction value based at least on the measured magnetic field and the characteristic of operation of the vehicle accessory. The vehicle accessory may be a stepper motor used to drive a vehicle function display on an instrument panel. The characteristic of operation of the stepper motor may be the position of the motor during a cycle of operation. In one embodiment, the correction value is determined by determining an average of a set of measured magnetic fields.

In another embodiment, a system for correcting a vehicle compass measurement for an interfering magnetic field generated by a vehicle accessory, where the interfering magnetic field has an intensity sufficient to cause a compass measurement error includes a magnetic field sensor for measuring a magnetic field for direction, a compass control circuit coupled to the magnetic field sensor, the compass control circuit configured to control the magnetic field sensor and to process the magnetic field measured by the magnetic field sensor, and an accessory control circuit coupled to the compass control circuit, the accessory control circuit configured to control the vehicle accessory and to provide a measurement signal to the compass control circuit instructing the compass control circuit to measure the magnetic field for direction based on a characteristic of operation of the vehicle accessory. In one embodiment, the correction value is determined by determining an average of a set of measured magnetic fields.

In yet another embodiment, a vehicle compass system for compensating for magnetic disturbances caused by a motor controlled by a motor control circuit includes a magnetic field sensor configured to sense the Earth's magnetic field and to generate orientation signals representative of the orientation of the magnetic field sensor with respect to the Earth's magnetic field and a control circuit configured to generate a heading based on a subset of orientation signals from the magnetic field sensor, the subset of orientation signals determined based on timing signals received from the motor control circuit. In a further embodiment, the subset of orientation signals is based on orientation signals received only when the timing signals indicate the motor is substantially not moving. Alternatively, the subset of orientation signals may be based on orientation signals received when the timing signals indicate a motor magnetic field signal is at a predetermined amplitude on a sinusoidal waveform.

In yet another embodiment, a vehicle compass system includes a magnetic field sensor configured to sense the Earth's magnetic field and to generate orientation signals representative of the orientation of the magnetic field sensor with respect to the Earth's magnetic field, a motor control circuit configured to generate motor drive signals to drive a motor coupled to an instrument panel of a vehicle, wherein the motor control circuit is configured to provide timing signals based on the motor drive signals, and a control circuit configured to generate a heading based on a subset of orientation signals from the magnetic field sensor, the subset of orientation signals determined based on the timing signals received from the motor control circuit. In a further embodiment, the subset of orientation signals is based on orientation signals received only when the timing signals indicate the motor is substantially not moving. Alternatively, the subset of orientation signals may be based on orientation signals received when the timing signals indicate a motor magnetic field signal is at a predetermined amplitude on a sinusoidal waveform.

BRIEF DESCRIPTION OF THE DRAWINGS

The invention will be more readily understood by reference to the following description taken with the accompanying drawings, in which.

DETAILED DESCRIPTION OF THE PREFERRED AND OTHER EXEMPLARY EMBODIMENTS

Figure 1:
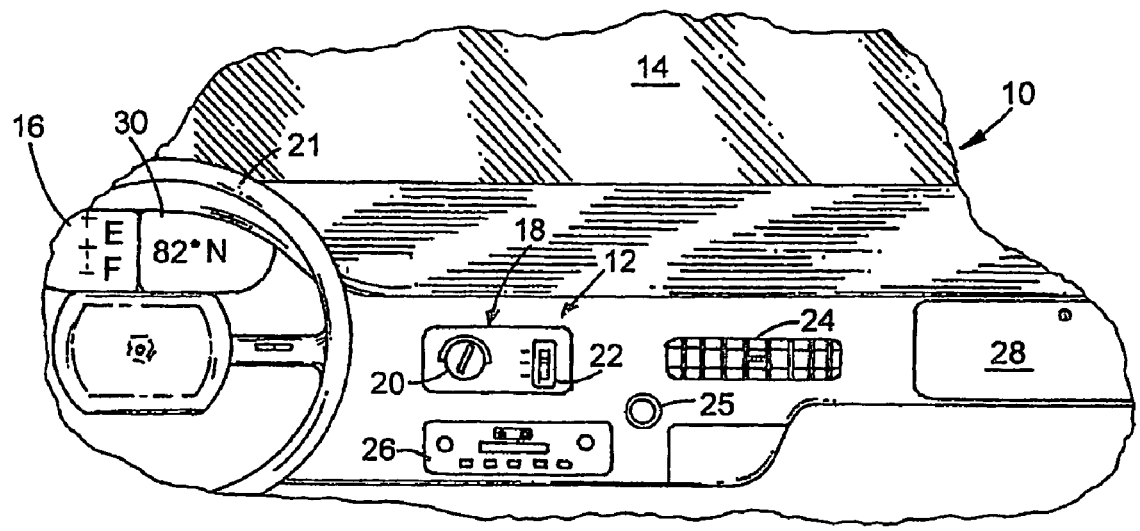
FIG. 1 is a perspective view of a vehicle instrument panel showing the electrical compass therein in accordance with an embodiment.

FIG. 1 shows a vehicle 10 such as an automobile and a front area of the vehicle 10 including an instrument panel 12 located below a front windshield 14. Instrument panel 12 has a display (or cluster) 16 that includes vehicle function displays, e.g., gauges, for a variety of vehicle functions such as speed, rpm, oil pressure, fuel level, battery condition, engine temperature and so on. Instrument panel 12 also includes a temperature control system 18 which may include a temperature setting control 20 and a fan speed control switch 22. In addition, instrument panel 12 also includes an electronic compass 30 which is preferably located adjacent to or integrated into the vehicle's instrument display 16, although compass 30 can be located anywhere in the instrument panel, an overhead compartment, or other vehicle interior element, as desired.

Instrument panel 12 typically also includes, for example, one or more ventilator outputs 24 for the HVAC system as well as an audio system 26 and other vehicle accessories. Gauges in the instrument display 16 utilize stepper motors to control, for example, a gauge needle position. Gauges may be used to indicate, for example, speed, rpm, oil pressure, fuel level, engine temperature, and so on. Stepper motors generate magnetic fields which can interfere with the magnetic sensors of the compass 30. Other vehicle subsystems such as a rear window defroster, turn signals and a sunroof may also provide a source of interfering magnetic fields.

Figure 2:
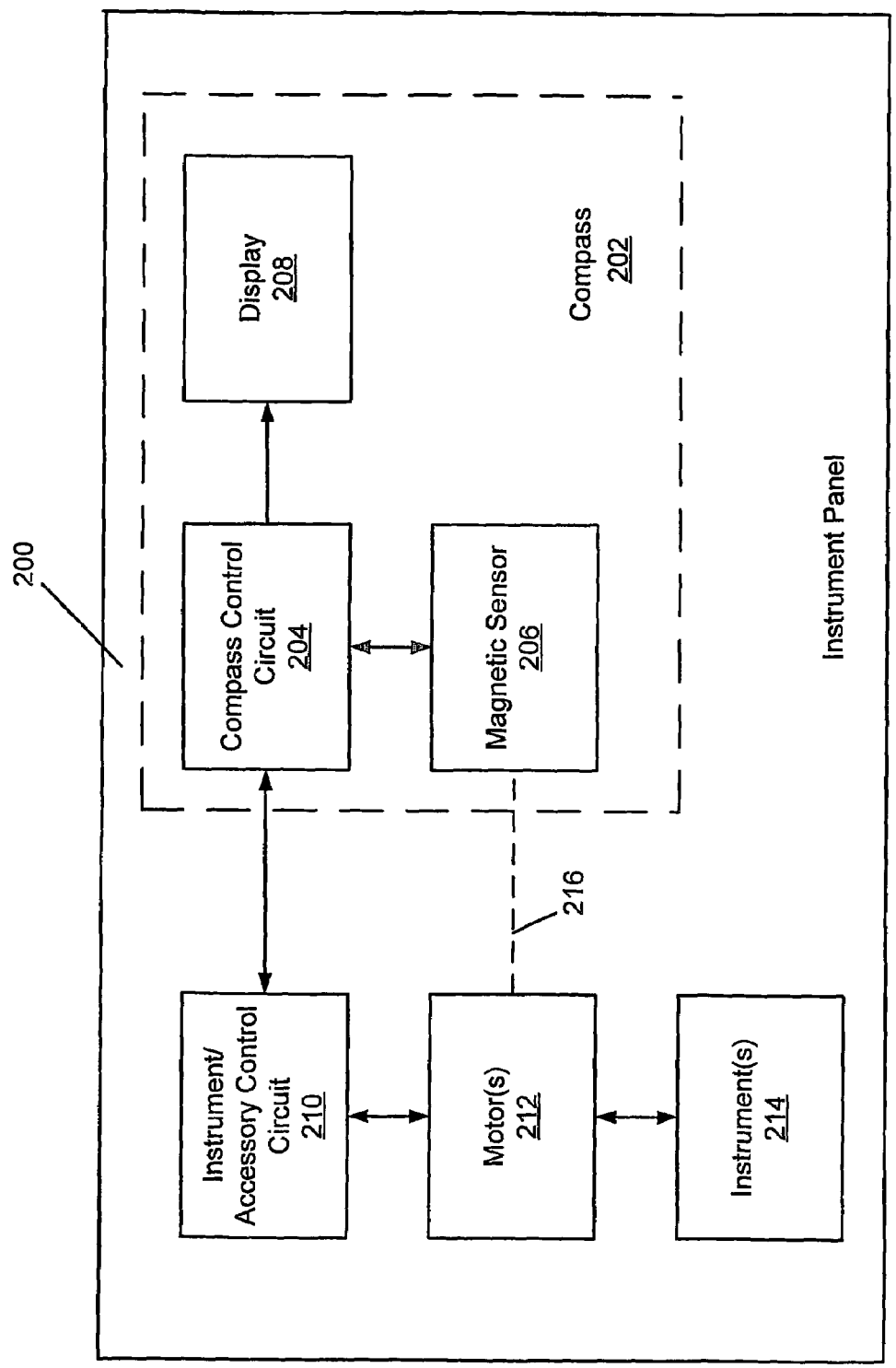
FIG. 2 is a block diagram of an instrument panel including an electrical compass in accordance with an embodiment.

FIG. 2 is a block diagram of an instrument panel including an electrical compass in accordance with an embodiment. Instrument panel 200 includes an electrical compass 202 and an instrument or accessory control circuit 210. Instrument panel 200 also includes motor(s) 212 (e.g., stepper motors, servo motors, etc.) and instrument(s) 214 (e.g., gauges for speed, rpm, etc.). Instrument or accessory control circuit 210 is used to control the various devices of the instrument panel, including the motion of motor(s) 212 and as such acts as a motor control circuit for motor(s) 212. Instrument control circuit 210 may be used to provide a motor drive signal to drive and control motor(s) 212. Instrument or accessory control circuit 210, therefore, is able to determine the position of motor(s) 212 during operation as well as whether the motor is moving or stopped. Instrument control circuit 210 preferably comprises a printed circuit board and a microprocessor. Instrument control circuit 210 may include various types on control circuitry, digital and/or analog, an may include a microprocessor, microcontroller, application-specific integrated circuit (ASIC), programmable logic, and/or other circuitry configured to perform various input/output, control, analysis, and other functions described herein.

Compass 202 includes a compass control circuit 204, magnetic sensor(s) 206 and a display 208. Magnetic sensor 206 can be a flux gate type sensor, a magnetoinductive sensor, a magnetoresistive sensor, or other device which can sense the earth's magnetic field (e.g., measure a magnetic field for direction) and provide signals (e.g., orientation signals) representative thereof to the compass control circuit 204. The sensor selected will require signal conditioning to provide a signal format to a compass control circuit 204 data input in a conventional manner known to those skilled in the art such as described in U.S. Pat. No. 5,878,370, incorporated herein by reference. Compass control circuit 204 generates a heading based on the orientation signals provided by the magnetic sensor 206. Compass control circuit 204 preferably comprises a printed circuit board and a microprocessor. Compass control circuit 204 may include various types of control circuitry, digital and/or analog, and may include a microprocessor, microcontroller, application-specific integrated circuit (ASIC), programmable logic, and/or other circuitry configured to perform various input/output, control, analysis, and other functions described herein.

Figure 3:
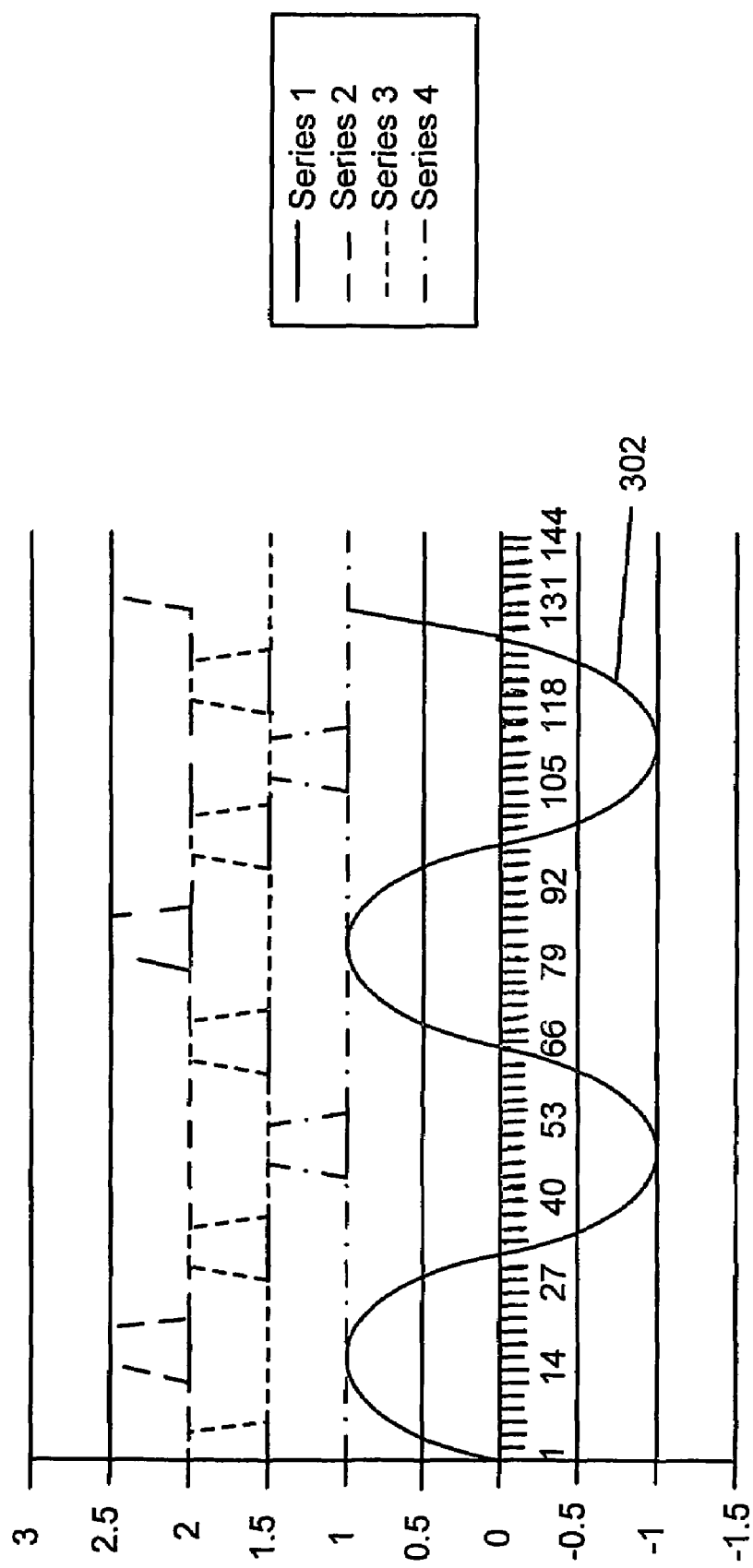
FIG. 3 shows an exemplary waveform representing the behavior of a magnetic field generated by the motion of a stepper motor.

Motor 212 may be positioned sufficiently close to magnetic sensor 206 as indicated by dashed line 216 so as to interfere with the magnetic field sensed by magnetic sensor 206. The following discussion of FIGS. 2-4 refers to a stepper motor although it should be understood that motor 212 may be other types of motors or accessories that produce a generally periodic magnetic field or magnetic disturbance. As mentioned, the stepper motor 212 can generate magnetic fields which can interfere with the magnetic sensors 206 of the compass 202 so as to cause an erroneous direction display (or heading) on compass display 208, at least temporarily, due to the interfering magnetic field. The magnetic disturbance of a stepper motor is generally periodic when the motor is moving (e.g., when a needle of a gauge in the instrument display is moving). The magnetic field created by the stepper motor 212 in close proximity to the magnetic sensor 206 resembles a Sine (or Cosine) wave 302, as shown in FIG. 3, when the stepper motor 212 is moving. When the stepper motor 212 has stopped, the magnitude of the magnetic field sensed by the compass magnetic sensor 206 from the stepper motor 212 will reside at a point (e.g., an amplitude) on the Sine (or Cosine) wave. In order to compensate for the magnetic disturbance caused by a stepper motor, the instrument or accessory control circuit 210 and the compass control circuit 204 are configured to determine a compensation or offset value for correcting the temporary magnetic field disturbance as described in connection with FIG. 4 below.

Figure 4:
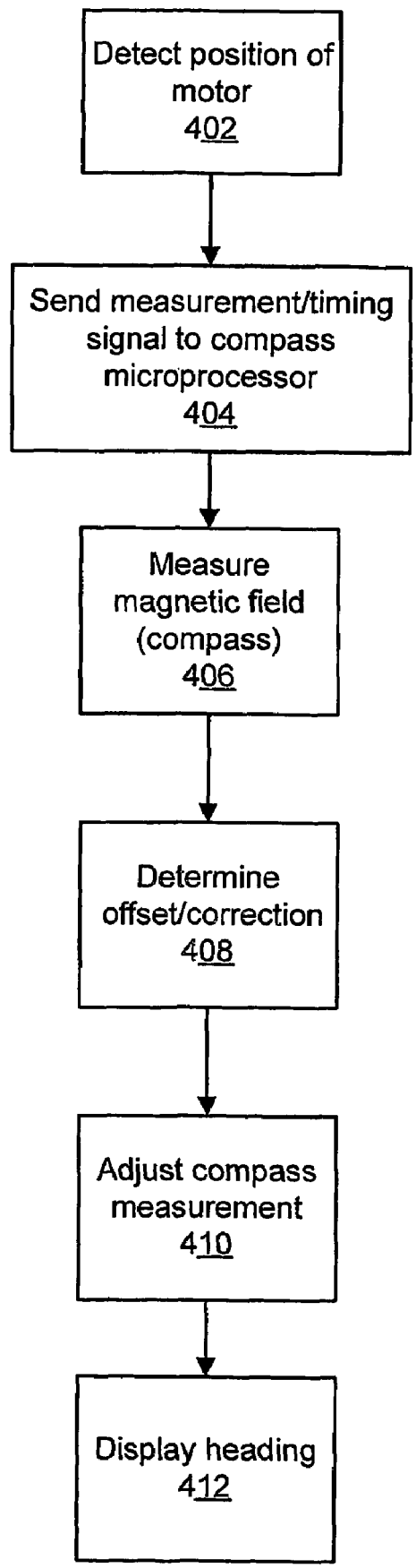
FIG. 4 illustrates a method for compensating for interfering magnetic fields in accordance with an embodiment.

FIG. 4 illustrates a method for compensating for interfering magnetic fields in accordance with an embodiment. As mentioned above, instrument control circuit 210 is coupled to stepper motor 212 and controls the motion of stepper motor 212. Accordingly, instrument control circuit 210 is able to monitor the position of stepper motor 212 at all times during a cycle of operation as well as whether stepper motor 212 is moving or stopped. At block 402 in FIG. 4, the position of stepper motor 212 is detected by instrument control circuit 210. The position of stepper motor 212 may include data regarding the rotational position of the magnet of the stepper motor, whether the stepper motor is moving or is stopped, the position (e.g., amplitude) of the stepper motor magnetic field waveform, and so on. Based on the position of stepper motor 212, at block 404 instrument control circuit 210 sends a measurement or timing signal to the compass control circuit 204. The measurement signal instructs compass 202 when to take a measurement of the Earth's magnetic field using magnetic sensor 206.

If stepper motor 212 is moving, preferably, instrument control circuit 210 instructs compass 202 to take a measurement at times corresponding to the peaks, valleys and center points of the stepper motor magnetic field waveform. Alternatively, instrument control circuit 210 can provide a measurement signal instructing compass 202 to take a measurement at a time corresponding to a consistent point on the stepper motor magnetic waveform. Preferably, the consistent point corresponds to the maximum and/or minimum of the stepper motor magnetic field waveform. In one embodiment, instrument control circuit 210 instructs compass 202

(via, for example, the measurement or timing signals) when to begin and end a measurement.

If stepper motor 212 is stopped, the magnetic field offset generated by the stepper motor is generally stable. Preferably, instrument control circuit 210 provides a measurement or timing signal that controls when stepper motor 212 is stopped, e.g., restricting the motor to stop only at times corresponding to peaks, valleys and midpoints of the stepper motor magnetic field waveform. Accordingly, these are the points at which the magnetic field for a stationary stepper motor may be measured.

At block 406, compass 202 takes a measurement of the earth's magnetic field based on the instruction (e.g., via the measurement or timing signal) provided by instrument control circuit 210. At block 408, an offset is determined to correct the compass measurement for the disturbance caused by the stepper motor. As discussed above, in one embodiment, instrument control circuit 210 instructs the compass 202 (e.g., via the measurement or timing signal) to take a magnetic measurement at a time corresponding to a symmetric part of the stepper motor magnetic field waveform during the stepper motor cycle, e.g., the peaks, valleys and center points of the stepper motor magnetic field waveform. Compass control circuit 204 averages the data collected at these points to determine an offset for the magnetic field generated by the stepper motor. The average value of the magnetic data is the offset or correction value for the stepper motor. Alternatively, instrument control circuit 210 can provide a measurement or timing signal instructing the compass 202 to take a measurement at a time corresponding to a consistent point on the magnetic field waveform. Preferably, compass control circuit 204 is instructed to take measurements when the magnetic field waveform is at its maximum and/or minimum. Compass control circuit 204 may provide the measurements, such as maximum and minimum field strength, to instrument control circuit 210. Instrument control circuit 210 may use the magnetic information to determine an offset for each data point measured by the compass. Alternatively, compass control circuit 204 determines an offset based on the magnetic information and provides the offset to the instrument control circuit 210. In one embodiment, the offset or correction determined by either the compass control circuit 204 or the instrument control circuit 210 is stored in memory (not shown).

At block 410, the compass measurement is adjusted based on the compensation or offset value determined by instrument control circuit 210 and/or compass control circuit 204. The adjusted magnetic measurement is then used to generate a display (or heading) showing the heading of the vehicle at block 412.

It is also important to note that the construction and arrangement of the elements of the electrical compass and instrument panel as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, variations in circuitry components, timing of measurements, number of error corrections, extent of compensation, values of parameters, mounting arrangements, materials, colors, orientations, etc.) without materially departing from the novel teachings and advantages of the subject matter recited herein. Accordingly, all such modifications are intended to be included within the scope of the present invention as described herein. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A method for correcting a vehicle compass measurement for an interfering magnetic field generated by a vehicle accessory, the interfering magnetic field having an intensity sufficient to cause a compass measurement error, the method comprising:
   monitoring the operation of the vehicle accessory;
   detecting a characteristic of operation of the vehicle accessory;
   generating a measurement signal based on the characteristic of operation;
   measuring a magnetic field for direction in response to the measurement signal; and
   determining a correction value based at least on the measured magnetic field and the characteristic of operation of the vehicle accessory.

2. A method according to claim 1, wherein the vehicle accessory is a stepper motor configured to drive a vehicle function display on an instrument panel.

3. A method according to claim 2, wherein the characteristic of operation is a position of the stepper motor during a cycle of operation of the stepper motor.

4. A method according to claim 1, wherein determining a correction value includes determining an average of a set of measured magnetic fields.

5. A system for correcting a vehicle compass measurement for an interfering magnetic field generated by a vehicle accessory, the interfering magnetic field having an intensity sufficient to cause a compass measurement error, the system comprising:
   a magnetic field sensor for measuring a magnetic field for direction;
   a compass control circuit coupled to the magnetic field sensor, the compass control circuit configured to control the magnetic field sensor and to process the magnetic field measured by the magnetic field sensor; and
   an accessory control circuit coupled to the compass control circuit, the accessory control circuit configured to control the vehicle accessory and to provide a measurement signal to the compass control circuit instructing the compass control circuit to measure the magnetic field for direction based on a characteristic of operation of the vehicle accessory.

6. A system according to claim 5, wherein the compass control circuit is further configured to determine a correction value based at least on the measured magnetic field and the characteristic of operation of the vehicle accessory.

7. A system according to claim 6, wherein determining the correction value includes determining an average of a set of measured magnetic fields.

8. A system according to claim 5, wherein the accessory control circuit is further configured to determine a correction value based at least on the measured magnetic field and the characteristic of operation of the vehicle accessory.

9. A system according to claim 8, wherein determining the correction value includes determining an average of a set of measured magnetic fields.

10. A system according to claim 5, wherein the vehicle accessory is a stepper motor configured to drive a vehicle function display in an instrument panel.

11. A system according to claim 10, wherein the characteristic of operation is a position of the stepper motor during a cycle of operation.

12. A vehicle compass system for compensating for magnetic disturbances caused by a motor controlled by a motor control circuit, the system comprising:
- a magnetic field sensor configured to sense the Earth's magnetic field and to generate orientation signals representative of the orientation of the magnetic field sensor with respect to the Earth's magnetic field; and
- a control circuit configured to generate a heading based on a subset of orientation signals from the magnetic field sensor, the subset of orientation signals determined based on timing signals received from the motor control circuit.

13. A vehicle compass system according to claim 12, wherein the subset of orientation signals is based on orientation signals received only when the timing signals indicate the motor is substantially not moving.

14. A vehicle compass system according to claim 12, wherein the subset of orientation signals is based on orientation signals received when the timing signals indicate a motor magnetic field signal is at a predetermined amplitude on a sinusoidal waveform.

15. A vehicle compass system according to claim 12, wherein the motor is a stepper motor.

16. A vehicle compass system according to claim 15, wherein the stepper motor is configured to drive a vehicle function display in an instrument panel of a vehicle.

17. A vehicle compass system, comprising:
- a magnetic field sensor configured to sense the Earth's magnetic field and to generate orientation signals representative of the orientation of the magnetic field sensor with respect to the Earth's magnetic field;
- a motor control circuit configured to generate motor drive signals to drive a motor coupled to an instrument panel of a vehicle, wherein the motor control circuit is configured to provide timing signals based on the motor drive signals; and
- a control circuit configured to generate a heading based on a subset of orientation signals from the magnetic field sensor, the subset of orientation signals determined based on the timing signals received from the motor control circuit.

* * * * *